US011832033B2

(12) United States Patent
Ballani et al.

(10) Patent No.: US 11,832,033 B2
(45) Date of Patent: Nov. 28, 2023

(54) EFFICIENTLY INTERCONNECTING COMPUTING NODES TO ENABLE USE OF HIGH-RADIX NETWORK SWITCHES

(71) Applicant: Microsoft Technology Licensing, LLC, Redmond, WA (US)

(72) Inventors: Hitesh Ballani, Cambridge (GB); Winston Allen Saunders, Seattle, WA (US); Christian L. Belady, Mercer Island, WA (US); Lisa Ru-Feng Hsu, Durham, NC (US); Paolo Costa, London (GB); Douglas M. Carmean, Seattle, WA (US)

(73) Assignee: Microsoft Technology Licensing, LLC

( * ) Notice: Subject to any disclaimer, the term of this patent is extended or adjusted under 35 U.S.C. 154(b) by 240 days.

(21) Appl. No.: 17/243,534

(22) Filed: Apr. 28, 2021

(65) Prior Publication Data

US 2022/0141558 A1 May 5, 2022

Related U.S. Application Data

(60) Provisional application No. 63/109,259, filed on Nov. 3, 2020.

(51) Int. Cl.
*H04Q 11/00* (2006.01)
(52) U.S. Cl.
CPC ..... *H04Q 11/0066* (2013.01); *H04Q 11/0005* (2013.01); *H04Q 11/0067* (2013.01);
(Continued)
(58) Field of Classification Search
CPC ........... H04Q 11/0066; H04Q 11/0005; H04Q 11/0067; H04Q 11/0071;
(Continued)

(56) References Cited

U.S. PATENT DOCUMENTS 4,695,999 A   9/1987   Lebizay
4,829,511 A * 5/1989   Georgiou ............... H04Q 3/521
                                                                398/55
(Continued)

FOREIGN PATENT DOCUMENTS

EP       0311772 A2     4/1989
WO    2017011649 A1     1/2017

OTHER PUBLICATIONS

Hamza, et al., "Wireless Communication in Data Centers: A Survey", In Proceedings of IEEE Communications Surveys & Tutorials, vol. 18, Issue 3, Jan. 26, 2016, pp. 1572-1595.
(Continued)

*Primary Examiner* — Vinncelas Louis
(74) *Attorney, Agent, or Firm* — RAY QUINNEY & NEBEKER P.C; James Bullough

(57) ABSTRACT

A system for efficiently interconnecting computing nodes can include a plurality of computing nodes and a plurality of network switches coupled in parallel to the plurality of computing nodes. The system can also include a plurality of node interfaces. Each computing node among the plurality of computing nodes can include at least one node interface for each network switch among the plurality of network switches. The plurality of node interfaces corresponding to a computing node can be configured to send data to another computing node via the plurality of network switches. The system can also include a plurality of switch interfaces. Each network switch among the plurality of network switches can include at least one switch interface for each computing node among the plurality of computing nodes. A switch interface corresponding to the computing node can be coupled to a node interface corresponding to the computing node.

20 Claims, 6 Drawing Sheets

(52) U.S. Cl.
CPC . *H04Q 11/0071* (2013.01); *H04Q 2011/0026* (2013.01); *H04Q 2011/0052* (2013.01); *H04Q 2011/0079* (2013.01)

(58) Field of Classification Search
CPC ... H04Q 2011/0026; H04Q 2011/0052; H04Q 2011/0079; H04Q 3/521; H04L 45/04; H04L 49/10; H04L 45/24
See application file for complete search history.

(56) References Cited

U.S. PATENT DOCUMENTS

| | | | |
|---|---|---|---|
| 5,943,150 | A | 8/1999 | Deri et al. |
| 6,795,655 | B1 | 9/2004 | Sidorovich et al. |
| 8,655,187 | B2 | 2/2014 | Davidson et al. |
| 8,954,698 | B2 | 2/2015 | Schenfeld et al. |
| 9,332,323 | B2 | 5/2016 | Zhang et al. |
| 9,520,961 | B2 | 12/2016 | Xia et al. |
| 9,696,538 | B2 | 7/2017 | Katayama et al. |
| 9,712,901 | B2 | 7/2017 | Zhang et al. |
| 10,467,021 | B2 | 11/2019 | Nguyen et al. |
| 10,552,227 | B2 | 2/2020 | Altstaetter et al. |
| 11,109,122 | B1 | 8/2021 | Saunders et al. |
| 2003/0091267 | A1 | 5/2003 | Alvarez et al. |
| 2005/0013311 | A1 | 1/2005 | Samudrala et al. |
| 2012/0124590 | A1 | 5/2012 | Balakrishnan et al. |
| 2013/0156425 | A1 | 6/2013 | Kirkpatrick et al. |
| 2013/0287397 | A1 | 10/2013 | Frankel et al. |
| 2014/0280687 | A1 | 9/2014 | Egi et al. |
| 2016/0091685 | A1 | 3/2016 | Raza et al. |
| 2016/0261364 | A1 | 9/2016 | Jiang et al. |
| 2016/0301996 | A1 | 10/2016 | Morris et al. |
| 2018/0287818 | A1* | 10/2018 | Goel ................. H04Q 11/0066 |
| 2019/0245924 | A1 | 8/2019 | Li |
| 2020/0003970 | A1 | 1/2020 | Marchetti et al. |
| 2020/0029136 | A1 | 1/2020 | Saleh |
| 2021/0409848 | A1 | 12/2021 | Saunders et al. |
| 2022/0140934 | A1 | 5/2022 | Ballani et al. |
| 2023/0125673 | A1 | 4/2023 | Ballani et al. |

OTHER PUBLICATIONS

"International Search Report and Written Opinion Issued in PCT Application No. PCT/US21/034683", dated Sep. 28, 2021, 13 Pages.

Ali, et al., "Price/Cooling Aware and Delay Sensitive Scheduling in Geographically Distributed Data Centers", In Proceedings of IEEE/IFIP Network Operations and Management Symposium, Apr. 25, 2016, pp. 1025-1030.

Arnon, Shlomi, "Next-Generation Optical Wireless Communications for Data Centers", In Proceedings of IEEE International Society for Optics and Photonics, vol. 9387, Feb. 7, 2015, 7 Pages.

Farrington, et al., "Helios: A Hybrid Electrical/Optical Switch Architecture for Modular Data Centres", In Proceedings of ACM SIGCOMM Computer Communication Review, vol. 40, Issue 4, Aug. 30, 2010, pp. 339-350.

Imran, et al., "HOSA: Hybrid Optical Switch Architecture for Data Center Networks", In Proceedings of the 12th ACM International Conference on Computing Frontiers, May 18, 2015, 8 Pages.

Wang, et al., "c-Through: Part-Time Optics in Data Centers", In Proceedings of ACM SIGCOMM Computer Communication Review, vol. 40, Issue 4, Aug. 30, 2010, pp. 327-338.

"International Search Report and Written Opinion Issued in PCT Application No. PCT/US21/053869", dated Jan. 18, 2022, 11 Pages.

Ishii, et al., Toward Exa-Scale Optical Circuit Switch Interconnect Networks for Future Datacenter/HPC, In Proceedings of International Society for Optics and Photonics, vol. 10131, Jan. 28, 2017, 9 Pages.

"Non Final Office Action Issued in U.S. Appl. No. 16/917,875", dated Jan. 14, 2021, 13 Pages.

Cheng, et al., "Photonic switching in high performance datacenters", In Journal of Optics Express, vol. 26, No. 12, Jun. 11, 2018, pp. 16022-16043.

Kachris, et al., "A Survey on Optical Interconnects for Data Centers", In Journal of IEEE Communications Surveys & Tutorials, vol. 14, Issue 4, Jan. 11, 2012, pp. 1021-1036.

Shrivastav, et al., "Shoal: A Network Architecture for Disaggregated Racks", In 16th {USENIX} Symposium on Networked Systems Design and Implementation, 2019, pp. 255-270.

"International Search Report and Written Opinion Issued in PCT Application No. PCT/US2021/057827", dated Feb. 14, 2022, 14 Pages.

"International Search Report and Written Opinion Issued in PCT Application No. PCT/US2021/034683", dated Sep. 28, 2021, 13 Pages.

"International Search Report and Written Opinion Issued in PCT Application No. PCT/US2021/053869", dated Jan. 18, 2022, 11 Pages.

"Notice of Allowance Issued in U.S. Appl. No. 17/173,052", dated Aug. 31, 2022, 5 Pages.

"Notice of Allowance Issued in U.S. Appl. No. 17/173,052", dated Mar. 21, 2022, 7 Pages.

"Non Final Office Action Issued in U.S. Appl. No. 17/461,758", dated Sep. 27, 2022, 23 Pages.

"Non Final Office Action Issued in U.S. Appl. No. 17/173,052", dated Oct. 5, 2021, 18 Pages.

"Notice of Allowance Issued in U.S. Appl. No. 17/461,758", dated Feb. 2, 2023, 5 Pages.

"Notice of Allowance Issued in U.S. Appl. No. 18/087,429", dated Jun. 7, 2023, 9 Pages.

\* cited by examiner

EFFICIENTLY INTERCONNECTING COMPUTING NODES TO ENABLE USE OF HIGH-RADIX NETWORK SWITCHES

CROSS-REFERENCE TO RELATED APPLICATION

This application is related to and claims the benefit of U.S. Provisional Patent Application No. 63/109,259 filed on Nov. 3, 2020. The aforementioned application is expressly incorporated herein by reference in its entirety.

BACKGROUND

High-speed data communications often utilize a serializer/deserializer (SerDes). A SerDes converts multiple parallel data streams into a serial data stream that is transmitted over a high-speed connection to a receiver that converts the serial data stream back to the original parallel data streams. The basic SerDes function can be implemented with two functional blocks: a parallel-to-serial converter on the transmitter side, and a serial-to-parallel converter on the receiver side.

Suppose, for example, that a source computing node has n parallel data streams to send to a destination computing node, where n can be any positive integer greater than or equal to two. Further suppose that each of these n data streams has a data rate of r. SerDes can be implemented with a parallel-to-serial converter at the source computing node and a serial-to-parallel converter at the destination computing node. The parallel-to-serial converter at the source computing node converts the n parallel data streams to a single data stream. The data rate of this single data stream is n·r. The serial-to-parallel converter at the destination computing node converts the single data stream back into n parallel data streams, each having a data rate of r.

Stated another way, with SerDes a plurality of relatively low-bandwidth channels (n parallel data streams, each having a data rate of r) can be converted into a single high-bandwidth channel (a single data stream having a data rate of n·r) for transmission from a source computing node to a destination computing node. The single high-bandwidth channel can then be converted back into a plurality of relatively low-bandwidth channels at the destination computing node.

SerDes can be beneficial because it reduces the cost of connectors and cables. In the above example, instead of requiring n separate cables (one for each of the n parallel data streams), there can be just a single cable connecting the source computing node and the destination computing node.

Much of the demand for high-speed SerDes comes from large-scale computer networks, like networks that are implemented in datacenters. A datacenter is a physical facility that is used to house computing systems (e.g., servers) and associated components. A large-scale datacenter network typically includes many network devices (e.g., switches, routers) that interconnect the computing systems in the datacenter.

The use of SerDes in large-scale computer networks can affect the way that network devices are configured. This is because, as discussed above, SerDes involves converting a plurality of relatively low-bandwidth channels (n parallel data streams, each having a data rate of r) into a single high-bandwidth channel (a single data stream having a data rate of n·r) for transmission from a source computing node to a destination computing node. Therefore, in networks that utilize SerDes, network devices can be configured to support the transmission of high-bandwidth channels.

SUMMARY

In accordance with one aspect of the present disclosure, a system is disclosed for efficiently interconnecting computing nodes in a datacenter. The system includes a plurality of computing nodes, a plurality of network switches coupled in parallel to the plurality of computing nodes, and a plurality of node interfaces for each computing node among the plurality of computing nodes. The plurality of node interfaces send and receive data communications among the plurality of computing nodes in the datacenter via the plurality of network switches without performing serialization or deserialization. The system also includes a plurality of switch interfaces. Each network switch among the plurality of network switches includes a switch interface for each computing node among the plurality of computing nodes. The switch interface corresponding to a computing node is coupled to a node interface corresponding to the computing node.

Each of the plurality of node interfaces may be configured to receive a serial data stream from a data source and send the serial data stream to another computing node via a network switch among the plurality of network switches.

The plurality of network switches may be optically coupled to the plurality of computing nodes. The plurality of node interfaces may include a plurality of node optical transceivers. Each node interface among the plurality of node interfaces may include at least one node optical transceiver. The plurality of switch interfaces may include a plurality of switch optical transceivers. Each switch interface among the plurality of switch interfaces may include at least one switch optical transceiver.

Communications between the plurality of node optical transceivers and the plurality of switch optical transceivers may occur via free-space optical communications.

The system may further include a plurality of optical cables that optically couple the plurality of node optical transceivers and the plurality of switch optical transceivers.

The plurality of network switches may be electrically coupled to the plurality of computing nodes.

In accordance with another aspect of the present disclosure, a system is disclosed for efficiently interconnecting computing nodes in a datacenter. The system includes a first plurality of network switches that interconnect a first plurality of computing nodes including a first computing node and a second computing node. The first plurality of network switches are coupled in parallel to the first plurality of computing nodes. The system also includes a first plurality of switch interfaces. Each network switch among the first plurality of network switches includes a switch interface for each computing node among the first plurality of computing nodes. The system also includes a first plurality of node interfaces corresponding to the first computing node. The first plurality of node interfaces are configured to send a plurality of parallel data streams to the second computing node via the first plurality of network switches. The first plurality of node interfaces send the plurality of parallel data streams to the second computing node without performing serialization. The system also includes a second plurality of node interfaces corresponding to the second computing node. The first plurality of node interfaces and the second plurality of node interfaces both include a node interface for each network switch among the first plurality of network switches. The second plurality of node interfaces are configured to receive the plurality of parallel data streams from the first computing node via the first plurality of network switches. The second plurality of node interfaces are configured to receive the plurality of parallel data streams from the first computing node without performing deserialization.

Each node interface among the first plurality of node interfaces may be configured to receive a serial data stream from a data source and send the serial data stream to the second computing node via the first plurality of network switches.

Each node interface among the second plurality of node interfaces may be configured to receive a serial data stream from a network switch and send the serial data stream to a data sink on the second computing node.

The first plurality of network switches may be optically coupled to the first plurality of computing nodes including the first computing node and the second computing node. The first plurality of node interfaces may include a first plurality of node optical transceivers. The second plurality of node interfaces may include a second plurality of node optical transceivers. The first plurality of switch interfaces may include a first plurality of switch optical transceivers optically coupled to the first plurality of node optical transceivers and a second plurality of switch optical transceivers optically coupled to the second plurality of node optical transceivers.

The first plurality of node optical transceivers may be configured to communicate with the first plurality of switch optical transceivers and the second plurality of node optical transceivers may be configured to communicate with the second plurality of switch optical transceivers via free-space optical communications.

The system may further include a first plurality of optical cables that optically couple the first plurality of node optical transceivers and the first plurality of switch optical transceivers. The system may also include a second plurality of optical cables that optically couple the second plurality of node optical transceivers and the second plurality of switch optical transceivers.

The first plurality of node interfaces may be electrically coupled to a first subset of the first plurality of switch interfaces. The second plurality of node interfaces may be electrically coupled to a second subset of the first plurality of switch interfaces.

The system may also include a second plurality of network switches coupled to a second plurality of computing nodes. The system may also include additional network switches that enable the first plurality of computing nodes to communicate with the second plurality of computing nodes. The additional network switches may be coupled to the first plurality of network switches and the second plurality of network switches.

In accordance with another aspect of the present disclosure, a system is disclosed for efficiently interconnecting computing nodes. The system includes a first plurality of network switches that interconnect a first plurality of computing nodes including a first computing node and a second computing node. The first plurality of network switches are optically coupled to the first plurality of computing nodes in a parallel configuration. The system also includes a plurality of switch optical transceivers. Each network switch among the first plurality of network switches includes a switch optical transceiver for each computing node among the first plurality of computing nodes. The system also includes a first plurality of node optical transceivers corresponding to the first computing node. The first plurality of node optical transceivers are configured to transmit a plurality of parallel data streams to the second computing node via the first plurality of network switches. The first plurality of node optical transceivers transmit the plurality of parallel data streams to the second computing node without performing serialization. The system also includes a second plurality of node optical transceivers corresponding to the second computing node. The first plurality of node optical transceivers and the second plurality of node optical transceivers both include at least one node optical transceiver for each network switch among the first plurality of network switches. The second plurality of node optical transceivers are configured to receive the plurality of parallel data streams from the first computing node via the first plurality of network switches. The second plurality of node optical transceivers are configured to receive the plurality of parallel data streams from the first computing node without performing deserialization.

Each node optical transceiver among the first plurality of node optical transceivers may be configured to receive a serial data stream from a data source and transmit the serial data stream to one of the plurality of switch optical transceivers.

Each node optical transceiver among the second plurality of node optical transceivers may be configured to receive a serial data stream from one of the plurality of switch optical transceivers and provide the serial data stream to a data sink on the second computing node.

The first plurality of node optical transceivers may be configured to communicate with a first subset of the plurality of switch optical transceivers and the second plurality of node optical transceivers may be configured to communicate with a second subset of the plurality of switch optical transceivers via free-space optical communications.

The system may further include a first plurality of optical cables that optically couple the first plurality of node optical transceivers and a first subset of the plurality of switch optical transceivers. The system may further include a second plurality of optical cables that optically couple the second plurality of node optical transceivers and a second subset of the plurality of switch optical transceivers.

The system may also include a second plurality of network switches coupled to a second plurality of computing nodes. The system may also include additional network switches that enable the first plurality of computing nodes to communicate with the second plurality of computing nodes. The additional network switches may be optically coupled to the first plurality of network switches and the second plurality of network switches.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
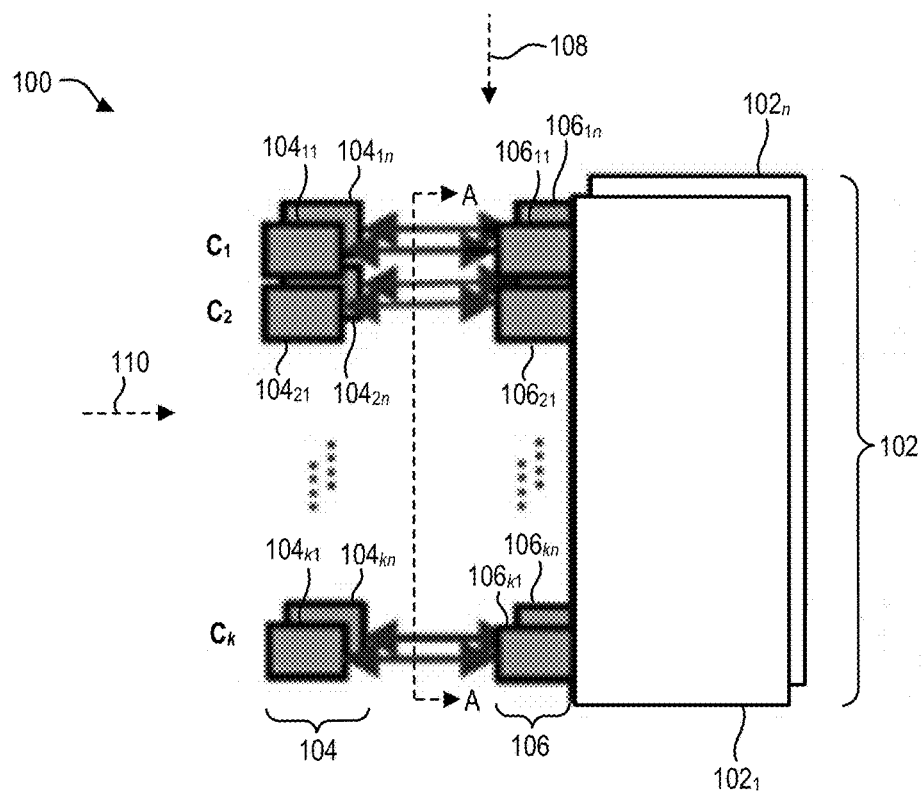
FIG. 1A illustrates a network that includes a plurality of computing nodes that are interconnected by a plurality of parallel network switches.

The present disclosure is generally related to techniques for efficiently interconnecting a plurality of computing nodes. The techniques disclosed herein can be implemented in a wide variety of computer networks, including large-scale computer networks utilized in datacenters.

In computer networking, a hop occurs when data is passed from one network segment to the next. The term "hop count" can refer to the number of intermediate devices through which data passes between a source computing node and a destination computing node. It is generally desirable to minimize the average hop count for data transmissions in the network. This can have several benefits, including minimizing latency between the computing nodes in the network.

A network in which there is no hierarchy of network devices can be thought of as a "flat" network. One example of a flat network is a network in which a plurality of different computing systems are interconnected by a single network switch. The hop count for data transmissions in a perfectly flat network is one. In other words, in such a network data passes through one intermediate device (the network switch) on its way from the source computing node to the destination computing node.

A perfectly flat network topology may not be feasible when there are many computing nodes to be interconnected. However, "flattening" a network's topology (e.g., reducing the extent to which the network is hierarchical) can be beneficial. For example, flattening a network's topology can reduce the average hop count for data transmissions in the network and therefore may reduce latency within the network. The amount of power that is consumed by the network can also be reduced.

The radix of a network device (e.g., a network switch) is a measure of the number of computing nodes that can be interconnected by the network device. The radix of a network device can be expressed in terms of the number of input ports and output ports that can be supported by the network device.

With all else equal, a high-radix network device can interconnect more computing nodes than a low-radix network device. Therefore, generally speaking, the use of higher-radix network devices enables a network's topology to be flatter than it could be if lower-radix network devices were used instead.

Generally speaking, however, there is a tradeoff between the radix of a network device and the bandwidth that can be supported by the network device. Increasing the radix of a network device can reduce the bandwidth that can be supported by the network device (and vice versa). Because of this tradeoff, it is not always possible to use high-radix network devices in computer networks. For example, as discussed above, the use of SerDes in computer networks often requires network devices to support high-bandwidth transmissions.

The present disclosure proposes techniques that enable the use of high-radix network devices in computer networks, including large-scale computer networks. The present disclosure proposes the use of a massively parallel, thin channel network. If a source computing node has data to send to a destination computing node, the data can be sent across a plurality of relatively low-bandwidth channels that are transmitted in parallel from the source computing node to the destination computing node. In other words, instead of converting a plurality of relatively low-bandwidth data streams to a single, high-bandwidth data stream for transmission across the network (as in the SerDes approach), the present disclosure proposes transmitting a plurality of relatively low-bandwidth data streams in parallel from the source computing node to the destination computing node. Because low-bandwidth data streams are being transmitted across the network, network devices do not have to support high data rates. This makes it possible to use high-radix network devices that are able to interconnect a large number of computing nodes.

Enabling the use of high-radix network devices in computer networks can provide several benefits. For example, the use of high-radix devices can enable a network's topology to be flatter than it could be if lower-radix network devices were used instead. This can reduce the latency of the network by reducing the number of hops that are required to send data across the network. Flattening a network's topology can also reduce the amount of power that is consumed by the network.

FIGS. 1A through 1D illustrate an example of a network 100 in which the techniques disclosed herein can be utilized. Reference is initially made to FIG. 1A, which shows a plurality of interconnected computing nodes. It will be assumed that there are k computing nodes in the depicted network 100, where the value of k can be any positive integer that is greater than or equal to two. FIG. 1A shows computing nodes labeled $C_1, C_2, \ldots C_k$.

The network 100 also includes a plurality of network switches 102. It will be assumed that there are n network switches 102 in the depicted network 100, where the value of n can be any positive integer that is greater than or equal to two. FIG. 1A shows a first network switch $102_1$ and an $n^{th}$ network switch $102_n$.

The network switches 102 are coupled in parallel to computing nodes $C_1, C_2, \ldots C_k$. For example, each of the network switches 102 can be coupled to each of the computing nodes $C_1, C_2, \ldots C_k$.

To enable the computing nodes to be coupled to the network switches 102, the computing nodes and the network switches 102 include communication interfaces. To distinguish the communication interfaces corresponding to the computing nodes from the communication interfaces corresponding to the network switches 102, the communication interfaces corresponding to the computing nodes may be referred to herein as node interfaces 104, and the communication interfaces corresponding to the network switches 102 may be referred to herein as switch interfaces 106.

Each computing node includes a plurality of node interfaces 104. In the depicted network 100, each computing node includes a distinct node interface 104 for each network switch 102. Thus, in the depicted network 100 each computing node includes n node interfaces 104. FIG. 1A shows a first node interface 104n and an $n^{th}$ node interface $104_{1n}$ associated with the first computing node $C_1$, a first node interface $104_{21}$ and an $n^{th}$ node interface $104_{2n}$ associated with the second computing node $C_2$, and a first node interface $104_{k1}$ and an $n^{th}$ node interface $104_{kn}$ associated with the $k^{th}$ computing node $C_k$.

Each network switch 102 includes a plurality of switch interfaces 106. In the depicted network 100, each network switch 102 includes a distinct switch interface 106 for each of the k computing nodes. Thus, in the depicted network 100 each network switch 102 includes k switch interfaces 106. FIG. 1A shows a first switch interface $106_{11}$, a second switch interface $106_{21}$, and a $k^{th}$ switch interface $106_{k1}$ associated with the first network switch $102_1$. FIG. 1A also shows a first switch interface $106_{1n}$ and a $k^{th}$ switch interface $106_{kn}$ associated with the $n^{th}$ network switch $102_n$.

Figure 1B:
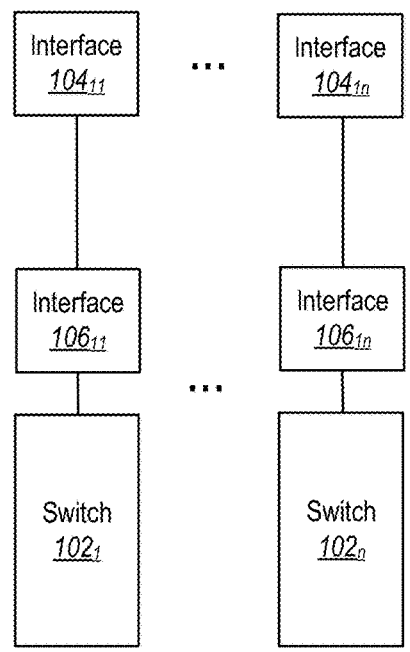
FIG. 1B is a top-down view of the network shown in FIG. 1A.

FIG. 1B is a top-down view of the network 100 shown in FIG. 1A. In other words, FIG. 1B illustrates the network 100 in FIG. 1A from a perspective that would be observed from a location that is above the network 100 looking in a downward direction 108. Thus, FIG. 1B shows a first node interface $104_{11}$ and an $n^{th}$ node interface $104_{1n}$ associated with the first computing node $C_1$. The first node interface $104_{11}$ is coupled to the first switch interface $106_{11}$ associated with the first network switch $102_1$. The $n^{th}$ node interface $104_{1n}$ is coupled to the first switch interface $106_{1n}$ associated with the $n^{th}$ network switch $102_n$.

Figure 1C:
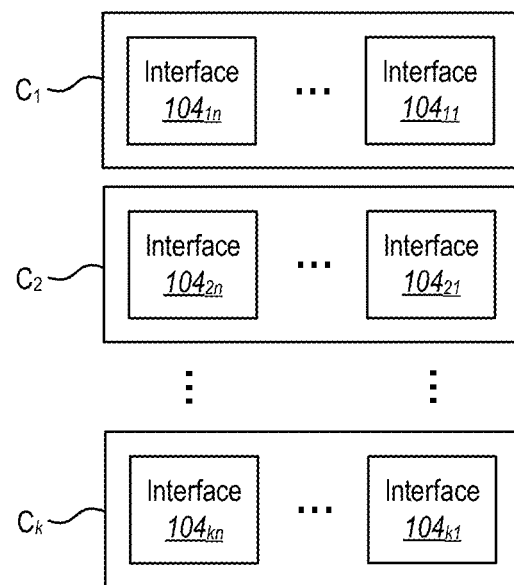
FIG. 1C is a side view of the network shown in FIG. 1A.

FIG. 1C is a side view of the network 100 shown in FIG. 1A. In other words, FIG. 1C illustrates the network 100 in FIG. 1A from a perspective that would be observed by someone who is located on the left side of FIG. 1A and who observes the network 100 from a sideward direction 110. Thus, FIG. 1C shows an $n^{th}$ node interface $104_{1n}$ and a first node interface $104_{11}$ associated with the first computing node $C_1$, an $n^{th}$ node interface $104_{2n}$ and a first node interface $104_{21}$ associated with the second computing node $C_2$, and an $n^{th}$ node interface $104_{kn}$ and a first node interface $104_{k1}$ associated with the $k^{th}$ computing node $C_k$.

Figure 1D:
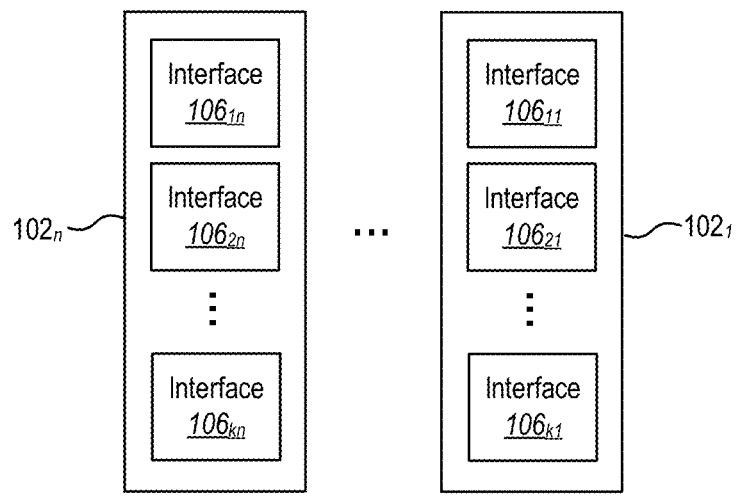
FIG. 1D is a cross-sectional view of the network taken along the line A-A shown in FIG. 1A.

FIG. 1D is a cross-sectional view of the network 100 taken along the line A-A shown in FIG. 1A. Thus, FIG. 1D shows a first switch interface $106_{1n}$, a second switch interface $106_{2n}$, and a $k^{th}$ switch interface $106_{kn}$ associated with the $n^{th}$ network switch $102_n$. FIG. 1D also shows a first switch interface $106_{11}$, a second switch interface $106_{21}$, and a $k^{th}$ switch interface $106_{k1}$ associated with the first network switch $102_1$.

In the following discussion, reference will be made to FIGS. 1A through 1D collectively.

The node interfaces 104 associated with a particular computing node can be coupled to corresponding switch interfaces 106 associated with the particular computing node. For example, the node interfaces 104 associated with the first computing node $C_1$ include a first node interface $104_{11}$ and an $n^{th}$ node interface $104_{1n}$. The switch interfaces 106 associated with the first computing node $C_1$ include a first switch interface $106_{11}$ associated with the first network switch $102_1$ and a first switch interface $106_{1n}$ associated with the $n^{th}$ network switch $102_n$. The first node interface $104_{11}$ associated with the first computing node $C_1$ is coupled to the first switch interface $106_{11}$ associated with the first network switch $102_1$. The $n^{th}$ node interface $104_{1n}$ associated with the first computing node $C_1$ is coupled to the first switch interface $106_{1n}$ associated with the $n^{th}$ network switch $102_n$.

Similarly, the node interfaces 104 associated with the second computing node $C_2$ include a first node interface $104_{21}$ and an $n^{th}$ node interface $104_{2n}$. The switch interfaces 106 associated with the second computing node $C_2$ include a second switch interface $106_{21}$ associated with the first network switch $102_1$ and a second switch interface $106_{2n}$ associated with the $n^{th}$ network switch $102_n$. The first node interface $104_{21}$ associated with the second computing node $C_2$ is coupled to the second switch interface $106_{21}$ associated with the first network switch $102_1$. The $n^{th}$ node interface $104_{2n}$ associated with the second computing node $C_2$ is coupled to the second switch interface $106_{2n}$ associated with the $n^{th}$ network switch $102_n$.

The node interfaces 104 associated with the $k^{th}$ computing node $C_k$ include a first node interface $104_{k1}$ and an $n^{th}$ node interface $104_{kn}$. The switch interfaces 106 associated with the $k^{th}$ computing node $C_k$ include a $k^{th}$ switch interface $106_{k1}$ associated with the first network switch $102_1$ and a $k^{th}$ switch interface $106_{kn}$ associated with the $n^{th}$ network switch $102_n$. The first node interface $104_{k1}$ associated with the $k^{th}$ computing node $C_k$ is coupled to the $k^{th}$ switch interface $106_{k1}$ associated with the first network switch $102_1$. The $n^{th}$ node interface $104_{kn}$ associated with the $k^{th}$ computing node $C_k$ is coupled to the $k^{th}$ switch interface $106_{kn}$ associated with the $n^{th}$ network switch $102_n$.

In some embodiments, the node interfaces 104 associated with a particular computing node can be optically coupled to corresponding switch interfaces 106 associated with the particular computing node. In other words, the node interfaces 104 associated with a particular computing node can be configured to communicate with corresponding switch interfaces 106 associated with the particular computing node via optical communications. In some embodiments, the optical communications can take the form of free-space optical communications, which involve the use of light propagating in free space to wirelessly transmit data. Alternatively, in other embodiments, the node interfaces 104 associated with a particular computing node can be optically coupled to corresponding switch interfaces 106 associated with the particular computing node via optical cables such as fiber-optic cables.

In some embodiments, the node interfaces 104 associated with a particular computing node can be electrically coupled to corresponding switch interfaces 106 associated with the particular computing node. For example, the node interfaces 104 associated with a particular computing node can be electrically coupled to corresponding switch interfaces 106 associated with the particular computing node via electrically conductive wires and/or via electrical cables. Communications between the node interfaces 104 associated with a particular computing node and the corresponding switch interfaces 106 associated with the particular computing node can occur electronically.

Each computing node can be configured to send data to another computing node via the plurality of network switches 102. The data can be sent as a plurality of parallel data streams via the node interfaces 104 and the switch interfaces 106. In the specific example shown in FIGS. 1A through 1D, the data can be sent as n parallel data streams.

Consider a specific example in which the first computing node $C_1$ sends data to the second computing node $C_2$. In accordance with the present disclosure, each node interface 104 associated with the first computing node $C_1$ can send a distinct data stream to the corresponding switch interface 106. For example, the first node interface $104_{11}$ associated with the first computing node $C_1$ can send a first data stream to the first switch interface $106_{11}$ associated with the first network switch $102_1$. The $n^{th}$ node interface $104_{1n}$ associated with the first computing node $C_1$ can send an $n^{th}$ data stream to the first switch interface $106_{1n}$ associated with the $n^{th}$ network switch $102_n$. Additional node interfaces 104 associated with the first computing node $C_1$ (which, for simplicity, are not shown in FIGS. 1A through 1D) can send additional data streams to corresponding switch interfaces 106.

The network switches 102 can forward the various data streams to the switch interfaces 106 that correspond to the intended destination, and these switch interfaces 106 can then forward the data streams to the appropriate node interfaces 104. In the present example, the first network switch $102_1$ can forward the first data stream from the first switch interface $106_{11}$ to the second switch interface $106_{21}$, which can then forward the first data stream to the first node interface $104_{21}$ associated with the second computing node $C_2$. The $n^{th}$ network switch $102_n$ can forward the $n^{th}$ data stream from the first switch interface $106_{1n}$ to the second switch interface $106_{2n}$, which can then forward the $n^{th}$ data stream to the $n^{th}$ node interface $104_{2n}$ associated with the second computing node $C_2$. Additional switch interfaces 106 associated with additional network switches 102 (which, for simplicity, are not shown in FIGS. 1A through 1D) can forward additional data streams to additional node interfaces 104 associated with the second computing node $C_2$.

The network 100 shown in FIG. 1 provides several advantages relative to the conventional SerDes approach that is commonly used. If conventional SerDes were performed as part of sending the n data streams from the first computing node $C_1$ to the second computing node $C_2$, and if each of the n data streams has a data rate of r, then a parallel-to-serial converter at the first computing node $C_1$ would convert the n data streams into a serial data stream having a data rate of n·r. This serial data stream would then be transmitted across the network to the second computing node $C_2$. A serial-to-parallel converter at the second computing node $C_2$ would then convert the serial data stream back into n parallel data streams, each having a data rate of r.

With the conventional SerDes approach, a network switch would be required to support high-bandwidth data transmissions. In the present example, a network switch that forwards data from the first computing node $C_1$ to the second computing node $C_2$ would be required to support a serial data stream having a data rate of n·r. Because there is a tradeoff between the bandwidth that can be supported by each port within a network switch and the radix of the network switch (as discussed above), the requirement to support high-bandwidth data transmissions limits the radix of the network switch. By limiting the radix of the network switch, the extent to which the network's topology can be flattened is also limited.

In contrast, in the network 100 shown in FIG. 1, the bandwidth that each network switch 102 is required to support is significantly lower than it would be if conventional SerDes were utilized. In particular, each network switch is only required to support a data rate of r (instead of n·r, as in the conventional SerDes approach). Because of the tradeoff between the radix of a network switch and the bandwidth that can be supported by the network switch, reducing the bandwidth that should be supported by the network switches 102 enables the network switches 102 to have a higher radix. Moreover, increasing the radix of the network switches 102 increases the extent to which the topology of the network 100 can be flattened, which can reduce latency within the network 100.

Stated another way, with the conventional SerDes approach there is a single "fat" (relatively high bandwidth) channel from the first computing node $C_1$ to the second computing node $C_2$. In contrast, in the network 100 shown in FIG. 1, there are a plurality of "thin" (relatively low bandwidth) channels from the first computing node $C_1$ to the second computing node $C_2$. The use of a plurality of thin channels instead of a single, fat channel enables the radix of the network switches 102 to be significantly higher, which enables the topology of the network 100 to be flattened and thereby reduces latency within the network 100.

The network 100 shown in FIGS. 1A-D illustrates how the techniques disclosed herein can be utilized for SerDes-free communication at datacenter scale. In other words, the techniques disclosed herein can be utilized for SerDes-free communication in a scenario, such as a datacenter, where a large number of computing nodes are being interconnected, and data communications can potentially travel large distances.

As discussed above, the network 100 shown in FIGS. 1A-D includes k computing nodes, and each computing node includes n node interfaces. In some embodiments, the value of k can be at least 100, and the value of n can be at least 10. In other words, in some embodiments the techniques disclosed herein can be utilized to interconnect at least 100 distinct computing nodes, and each computing node can include at least 10 distinct node interfaces. In other embodiments, larger values of k and/or n can be utilized. For example, in some embodiments, the value of k can be at least 1000, and the value of n can be at least 50. In other words, in some embodiments the techniques disclosed herein can be utilized to interconnect at least 1000 distinct computing nodes, and each computing node can include at least 50 distinct node interfaces.

The techniques disclosed herein can also be utilized to interconnect computing nodes that are located large distances from one another. In some embodiments, the techniques disclosed herein can be utilized to interconnect computing nodes that are located at least 10 meters from one another. In other embodiments, the techniques disclosed herein can be utilized to interconnect computing nodes that are located at least 50 meters from one another. In still other embodiments, the techniques disclosed herein can be utilized to interconnect computing nodes that are located at least 100 meters from one another.

Of course, the specific values that were included in the previous paragraphs are provided for purposes of example only, and should not be interpreted as limiting the scope of the present disclosure. The techniques disclosed herein can be utilized to interconnect a large number of computing nodes having a large number of node interfaces, and the specific number of computing nodes and node interfaces can be different from the specific values just mentioned. In addition, the plurality of computing nodes can be located large distances from one another, and the distances between plurality of computing nodes can vary from the specific values just mentioned.

In some embodiments, when n data streams are sent in parallel from one computing node to another computing node, each data stream can be a serial data stream. In other words, each node interface 104 can be configured to receive a serial data stream from a data source and send that serial data stream to the intended destination via the corresponding network switch. In embodiments where the network 100 is configured this way, it is not necessary to perform SerDes at all.

However, it is not necessary for each data stream to be a serial data stream, and the scope of the present disclosure should not be limited in this regard. SerDes can still be performed to some extent in accordance with the techniques disclosed herein. For example, in some alternative embodiments, each node interface 104 can be configured to receive a plurality of data streams from one or more data sources and to serialize those data streams in connection with sending them to another computing node. This will be explained in greater detail below.

The network 100 shown in FIGS. 1A-1D is provided for purposes of example only, and the specific characteristics of the network 100 should not be interpreted as limiting the scope of the present disclosure. The techniques disclosed herein can be utilized in other networks with characteristics that are different from those in the depicted network 100.

For example, in the depicted network 100, the node interfaces 104 are directly coupled to the switch interfaces 106. In other words, there are not any intermediate components between the node interfaces 104 and the switch interfaces 106. However, it is not necessary for the node interfaces 104 to be directly coupled to the switch interfaces 106. In some embodiments, there can be one or more additional components between the node interfaces 104 and the switch interfaces 106. For example, in some embodiments, one or more optical components (e.g., gratings) can be located between the node interfaces 104 and the switch interfaces 106.

As noted above, in the network 100 shown in FIGS. 1A-1D, the network switches 102 are coupled in parallel to the computing nodes $C_1, C_2, \ldots C_k$. Stated another way, the network switches 102 can be considered to be coupled in a parallel configuration with respect to the computing nodes $C_1, C_2, \ldots C_k$. In some embodiments, this can mean that each network switch 102 is coupled to each of the computing nodes $C_1, C_2, \ldots C_k$ in such a way that no other network switches are positioned between a particular network switch 102 and a particular computing node. This does not mean, however, that the network switches 102 must be directly coupled to the computing nodes (as discussed in the previous paragraph).

In some embodiments, if a particular network switch 102 is directly coupled to a first computing node $C_1$ and the network switch 102 is also directly coupled to a second computing node $C_2$ (as shown in FIG. 1A, for example), then the network switch 102 can be considered to be coupled in parallel to $C_1$ and $C_2$.

In some embodiments, if a particular network switch 102 is indirectly coupled to a first computing node $C_1$ and the network switch 102 is also indirectly coupled to a second computing node $C_2$, then the network switch 102 can be considered to be coupled in parallel to $C_1$ and $C_2$. A network switch 102 can be indirectly coupled to a computing node if there is at least one component, other than another network switch, coupled between the network switch 102 and the computing node.

In some embodiments, if a computing node is coupled to a first network switch and the first network switch is coupled to a second network switch, the first and second network switches would not be considered to be coupled in parallel.

In some embodiments, the network 100 shown in FIG. 1 can represent a network fabric. In this type of architecture, computing resources can be deployed in a relatively small number of highly interconnected layers. Unlike traditional multi-tier architectures, a network fabric effectively flattens the network architecture, thereby reducing the distance between endpoints.

Figure 2:
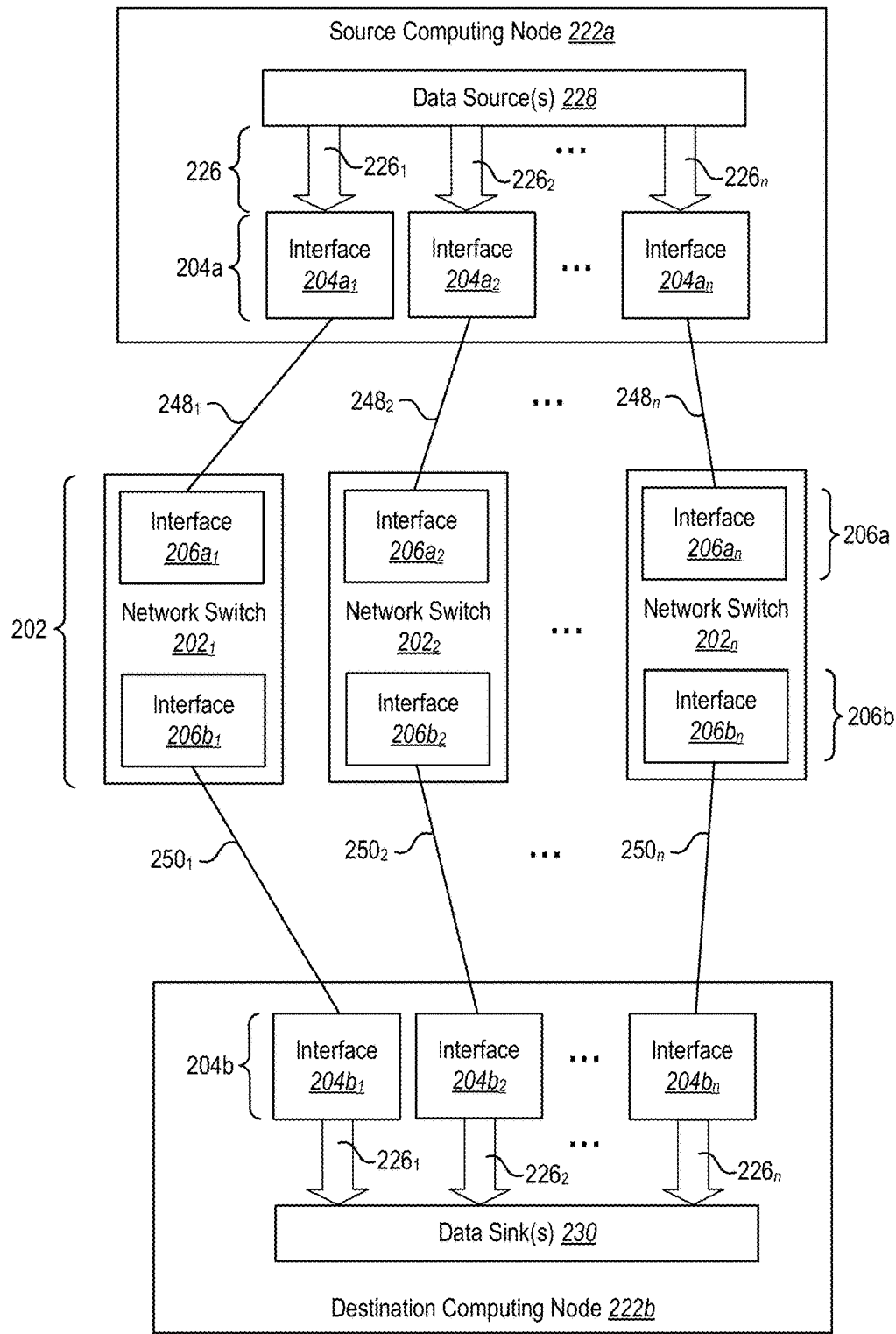
FIG. 2 illustrates an example showing how the techniques disclosed herein can be utilized when one computing node sends data to another computing node.

FIG. 2 illustrates an example showing how the techniques disclosed herein can be utilized when one computing node sends data to another computing node. The computing node that sends the data may be referred to as a source computing node 222a, and the computing node that receives the data may be referred to as a destination computing node 222b. The source computing node 222a and the destination computing node 222b may be part of a network 200 of interconnected computing nodes. The network 200 is an example of one possible implementation of the network 100 shown in FIGS. 1A-1D.

In the present example, it will be assumed that the source computing node 222a has n parallel data streams 226 to send to the destination computing node 222b, where n can be any positive integer greater than or equal to two. It will also be assumed that each of these n data streams 226 has a data rate of r. In some embodiments, the data streams 226 can be provided by a single data source 228. Alternatively, the data streams 226 can be provided by a plurality of different data sources 228.

The network 200 includes a plurality of network switches 202. There are n network switches 202 in the depicted network 200. FIG. 2 shows a first network switch $202_1$, a second network switch $202_2$, and an $n^{th}$ network switch $202_n$.

Each network switch 202 includes a plurality of switch interfaces. In the depicted network 200, each network switch 202 includes a distinct switch interface for each computing node in the network, including the source computing node 222a and the destination computing node 222b. The first network switch $202_1$ includes a switch interface $206a_1$ corresponding to the source computing node 222a and a switch interface $206b_1$ corresponding to the destination computing node 222b. The second network switch $202_2$ includes a switch interface $206a_2$ corresponding to the source computing node 222a and a switch interface $206b_2$ corresponding to the destination computing node 222b. The $n^{th}$ network switch $202_n$ includes a switch interface $206a_n$ corresponding to the source computing node 222a and a switch interface $206b_n$ corresponding to the destination computing node 222b.

The source computing node 222a includes a plurality of node interfaces 204a, and the destination computing node 222b also includes a plurality of node interfaces 204b. Both the source computing node 222a and the destination computing node 222b include a distinct node interface for each network switch 202. FIG. 2 shows the source computing node 222a with a first node interface $204a_1$ corresponding to the first network switch $202_1$, a second node interface $204a_2$ corresponding to the second network switch $202_2$, and an $n^{th}$ node interface $204a_n$ corresponding to the $n^{th}$ network switch $202_n$. FIG. 2 shows the destination computing node 222b with a first node interface $204b_1$ corresponding to the first network switch $202_1$, a second node interface $204b_2$ corresponding to the second network switch $202_2$, and an $n^{th}$ node interface $204b_n$ corresponding to the $n^{th}$ network switch $202_n$.

The node interfaces 204a, 204b are each coupled to a network switch 202. In particular, the first node interface $204a_1$ in the source computing node 222a is coupled to the switch interface $206a_1$ in the first network switch $202_1$. The second node interface $204a_2$ in the source computing node 222a is coupled to the switch interface $200a_2$ in the second network switch $202_2$. The $n^{th}$ node interface $204a_n$ in the source computing node 222a is coupled to the switch interface $206a_n$ in the $n^{th}$ network switch $202_n$. The first node interface $204b_1$ in the destination computing node 222b is coupled to the switch interface $206b_1$ in the first network switch $202_1$. The second node interface $204b_2$ in the destination computing node 222b is coupled to the switch interface $200b_2$ in the second network switch $202_2$. The $n^{th}$ node interface $204b_n$ in the destination computing node 222b is coupled to the switch interface $206b_n$ in the $n^{th}$ network switch $202_n$.

FIG. 2 shows a coupling $248_1$ between the first node interface $204a_1$ in the source computing node 222a and the switch interface $206a_1$ in the first network switch $202_1$, a coupling $248_2$ between the second node interface $204a_2$ in the source computing node 222a and the switch interface $206a_2$ in the second network switch $202_2$, and a coupling $248_n$ between the $n^{th}$ node interface $204a_n$ in the source computing node 222a and the switch interface $206a_n$ in the $n^{th}$ network switch $202_n$. FIG. 2 also shows a coupling $250_1$ between the first node interface $204b_1$ in the destination computing node 222b and the switch interface $206b_1$ in the first network switch $202_1$, a coupling $250_2$ between the second node interface $204b_2$ in the destination computing node 222b and the switch interface $206b_2$ in the second network switch $202_2$, and a coupling $250_n$ between the $n^{th}$ node interface $204b_n$ in the destination computing node 222b and the switch interface $206b_n$ in the $n^{th}$ network switch $202_n$.

In some embodiments, the various couplings $248_1$, $248_2$, ..., $248_n$ and $250_1$, $250_2$, ..., $250_n$ shown in FIG. 2 can represent optical couplings between the node interfaces 204a, 204b and the switch interfaces 206a, 206b. Alternatively, in other embodiments, the couplings $248_1$, $248_2$, ..., $248_n$ and $250_1$, $250_2$, ..., $250_n$ can represent electrical couplings.

In some embodiments where the computing nodes are optically coupled to the network switches 202, the couplings $248_1$, $248_2$, ..., $248_n$ and $250_1$, $250_2$, ..., $250_n$ can represent optical cables. Alternatively, in other such embodiments, the couplings $248_1$, $248_2$, ..., $248_n$ and $250_1$, $250_2$, ..., $250_n$ can represent optical paths that enable free-space optical communications to occur.

Of all the switch interfaces 206a, 206b that are shown in FIG. 2, a first subset (namely, the switch interfaces 206a) correspond to the source computing node 222a, and a second subset (namely, the switch interfaces 206b) correspond to the destination computing node 222b. The node interfaces 204a corresponding to the source computing node 222a are coupled to the first subset (namely, the switch interfaces 206a), and the node interfaces 204b corresponding to the destination computing node 222b are coupled to the second subset (namely, the switch interfaces 206a).

Different data streams 226 can be provided to different node interfaces 204a at the source computing node 222a. For example, FIG. 2 shows the first data stream $226_1$ being provided to the first node interface $204a_1$, the second data stream $226_2$ being provided to the second node interface $204a_2$, and the $n^{th}$ data stream $226_n$ being provided to the $n^{th}$ node interface $204a_n$.

Each node interface 204a at the source computing node 222a can be configured to send a different data stream 226 to the destination computing node 222b via a different network switch 202. For example, the first node interface $204a_1$ can be configured to send the first data stream $226_1$ to the destination computing node 222b via the first network switch $202_1$, the second node interface $204a_2$ can be configured to send the second data stream $226_2$ to the destination computing node 222b via the second network switch $202_2$, and the $n^{th}$ node interface $204a_n$ can be configured to send the $n^{th}$ data stream $226_n$ to the destination computing node 222b via the $n^{th}$ network switch $202_n$.

Each node interface 204b at the destination computing node 222b can be configured to receive a different data stream 226 from the source computing node 222a via a different network switch 202. For example, the first node interface $204b_1$ can be configured to receive the first data stream $226_1$ from the source computing node 222a via the first network switch $202_1$, the second node interface $204b_2$ can be configured to receive the second data stream $226_2$ from the source computing node 222a via the second network switch $202_2$, and the $n^{th}$ node interface $204b_n$ can be configured to receive the $n^{th}$ data stream $226_n$ from the source computing node 222a via the $n^{th}$ network switch $202_n$.

More specifically, the first node interface $204a_1$ at the source computing node 222a can send the first data stream $226_1$ to the switch interface $206a_1$ in the first network switch $202_1$ that corresponds to the source computing node 222a. The first network switch $202_1$ can then forward the first data stream $226_1$ to the switch interface $206b_1$ that corresponds to the destination computing node 222. This switch interface $206b_1$ can then forward the first data stream $226_1$ to the node interface $204b_1$ at the destination computing node 222b that corresponds to the first network switch $202_1$.

The second node interface $204a_2$ at the source computing node 222a can send the second data stream $226_2$ to the switch interface $206a_2$ in the second network switch $202_2$ that corresponds to the source computing node 222a. The second network switch $202_2$ can then forward the second data stream $226_2$ to the switch interface $206b_2$ that corresponds to the destination computing node 222. This switch interface $206b_2$ can then forward the second data stream $226_2$ to the node interface $204b_2$ at the destination computing node 222b that corresponds to the second network switch $202_2$.

The $n^{th}$ node interface $204a_n$ at the source computing node 222a can send the $n^{th}$ data stream $226_n$ to the switch interface $206a_n$ in the $n^{th}$ network switch $202_n$ that corresponds to the source computing node 222a. The $n^{th}$ network switch $202_n$ can then forward the $n^{th}$ data stream $226_n$ to the switch interface $206b_n$ that corresponds to the destination computing node. This switch interface $206b_n$ can then forward the $n^{th}$ data stream $226_n$ to the node interface $204b_n$ at the destination computing node 222b that corresponds to the $n^{th}$ network switch $202_n$.

Once the data streams 226 have been received at the destination computing node 222b, they can be provided to one or more data sinks 230. FIG. 2 shows the first node interface $204b_1$ at the destination computing node 222b providing the first data stream $226_1$ to the data sink(s) 230, the second node interface $204b_2$ at the destination computing node 222b providing the second data stream $226_2$ to the data sink(s) 230, and the $n^{th}$ node interface $204b_n$ at the destination computing node 222b providing the $n^{th}$ data stream $226_n$ to the data sink(s) 230.

Like the network 100 shown in FIGS. 1A-1D, the network 200 shown in FIG. 2 provides several advantages relative to the conventional SerDes approach that is commonly used. In particular, the bandwidth that each network switch 202 is required to support is significantly lower than it would be if conventional SerDes were utilized. Because of the tradeoff between the radix of a network switch 202 and the bandwidth that can be supported by the network switch 202, reducing the bandwidth that should be supported by the network switches 202 enables the network switches 202 to have a higher radix. Moreover, increasing the radix of the network switches 202 increases the extent to which the topology of the network 200 can be flattened, which can reduce latency within the network 200.

In the network 200 shown in FIG. 2, the node interfaces $204a_1, 204a_2, \ldots 204a_n$ are shown as part of the source computing node 222a, and the node interfaces $204b_1, 204b_2, \ldots 204b_n$ are shown as part of the destination computing node 222b. In an alternative embodiment, the node interfaces $204a_1, 204a_2, \ldots 204a_n$ can be separate from and coupled to the source computing node 222a, and the node interfaces $204b_1, 204b_2, \ldots 204b_n$ can be separate from and coupled to the destination computing node 222b.

In the network 200 shown in FIG. 2, the switch interfaces 206a, 206b are shown as part of the network switches 202. In an alternative embodiment, the switch interfaces 206a, 206b can be separate from and coupled to the network switches 202.

In some embodiments, the various network switches 202 can be grouped together and included within the same device. Alternatively, in other embodiments, the various network switches 202 can be included in separate devices.

In the example shown in FIG. 2, each data stream 226 can be a serial data stream. In other words, each node interface 204a at the source computing node 222a can be configured to receive a serial data stream from one or more data sources 228 and send that serial data stream to the destination computing node 222b via the corresponding network switch 202. In this case, it is not necessary to perform SerDes at all. In other words, all of the node interfaces 204a at the source computing node 222a and all of the node interfaces 204b at the destination computing node 222b can be configured for SerDes-free communication.

However, it is not necessary for each data stream to be a serial data stream, and the scope of the present disclosure should not be limited in this regard. SerDes can still be performed to some extent in accordance with the techniques disclosed herein.

Figure 3:
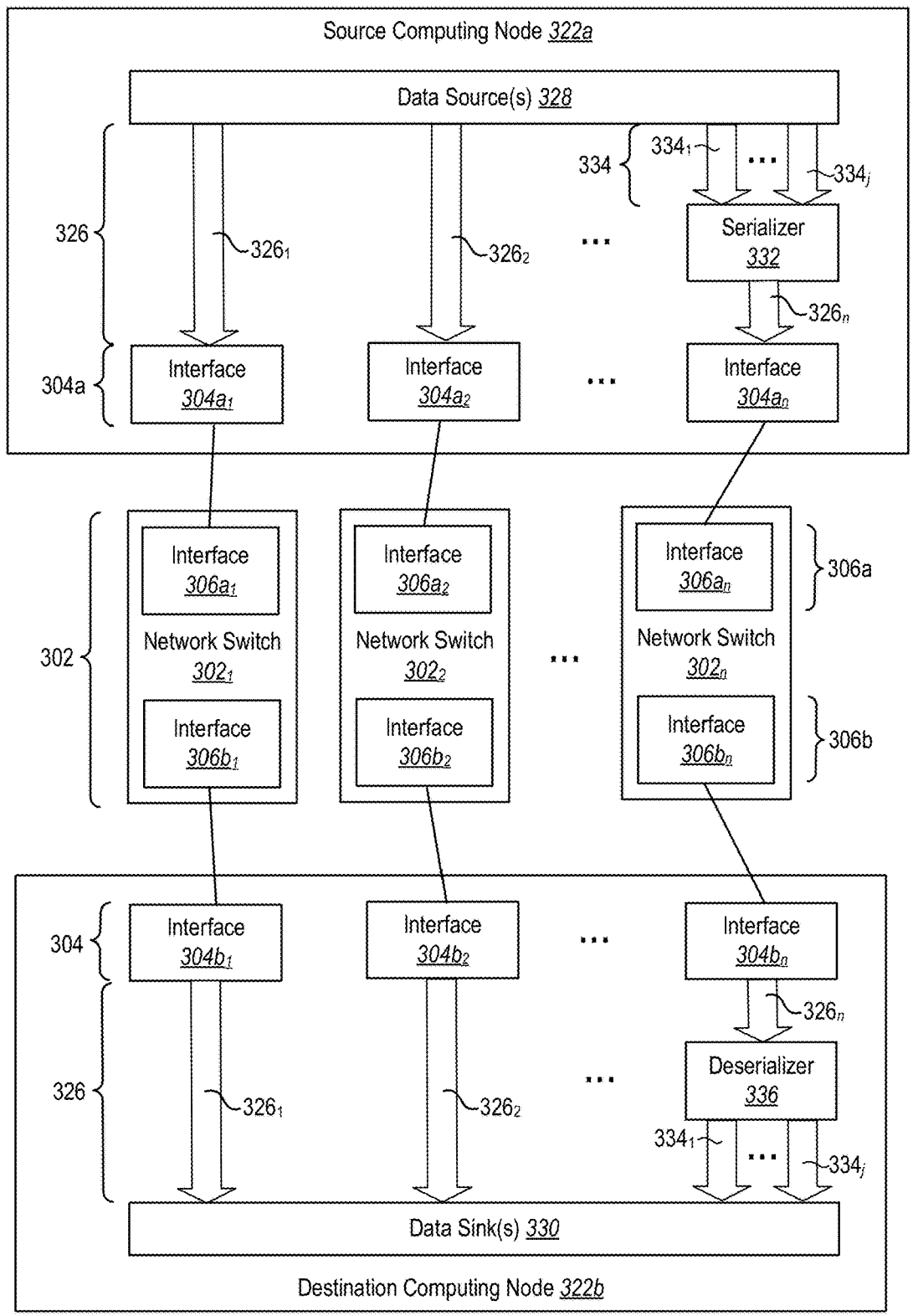
FIG. 3 illustrates an example of a network in which serialization/deserialization can be performed to some extent in accordance with the techniques disclosed herein.

FIG. 3 illustrates an example of a network 300 in which SerDes can still be performed, at least to some extent, in accordance with the techniques disclosed herein. The network 300 shown in FIG. 3 is similar in several respects to the network 200 shown in FIG. 2. For example, the network 300 includes a plurality of interconnected computing nodes, including a source computing node 322a and a destination computing node 322b. The network 300 includes a plurality of network switches 302 that interconnect the plurality of computing nodes in the network 300, including the source computing node 322a and the destination computing node 322b. The network switches 302 are connected in parallel between the source computing node 322a and the destination computing node 322b. The source computing node 322a includes a plurality of node interfaces 304a, and the destination computing node 322b includes a plurality of node interfaces 304b. The node interfaces 304a, 304b are coupled to the network switches 302.

In the network 200 shown in FIG. 2, each node interface 204a at the source computing node 222a receives a single serial data stream 226 from one or more data sources 228 and sends that serial data stream 226 to the destination computing node 222b via a corresponding network switch 202. Thus, in the network 200 shown in FIG. 2, it is not necessary to perform SerDes at all. In the network 300 shown in FIG. 3, however, one or more serializers 332 at the source computing node 322a can be configured to receive a plurality of parallel data streams 334 from one or more data sources 328, convert those parallel data streams 334 into a serial data stream $326_n$, and send the serial data stream $326_n$ to the destination computing node 322b via a corresponding network switch $302_n$. Thus, SerDes can be performed to some extent in the depicted network 300, although not in the same way as with conventional approaches.

The example shown in FIG. 3 includes a single set of parallel data streams 334. This set of parallel data streams 334 includes j parallel data streams 334. In that set of j parallel data streams 334, a first data stream $334_1$ and a $j^{th}$ data stream are shown in FIG. 3. In alternative embodiments, a network in accordance with the present disclosure can include more than one set of parallel data streams.

In addition to the set of parallel data streams 334, the example shown in FIG. 3 also includes other serial data streams $326_1, 326_2$ that can be transmitted from the source computing node 322a to the destination computing node 322b without performing SerDes.

A first node interface $304a_1$ at the source computing node 322a can send a first serial data stream $326_1$ to the destination computing node 322b via a first network switch $302_1$. More specifically, the first node interface $304a_1$ at the source computing node 322a can send the first serial data stream $326_1$ to the switch interface $306a_1$ in the first network switch $302_1$ that corresponds to the source computing node 322a. The first network switch $302_1$ can then forward the first serial data stream $326_1$ to the switch interface $306b_1$ that corresponds to the destination computing node 322b. This switch interface $306b_1$ can then forward the first serial data stream $326_1$ to the node interface $304b_1$ at the destination computing node 322b that corresponds to the first network switch $302_1$. The first serial data stream $326_1$ can then be provided to one or more data sinks 330.

A second serial data stream $326_2$ can be sent from the source computing node 322a to the destination computing node 322b via a second network switch $302_2$. More specifically, the second node interface $304a_2$ at the source computing node 322a can send the second serial data stream $326_2$ to the switch interface $306a_2$ in the second network switch $302_2$ that corresponds to the source computing node 322a. The second network switch $302_2$ can then forward the second serial data stream $326_2$ to the switch interface $306b_2$ that corresponds to the destination computing node 322b. This switch interface $306b_2$ can then forward the second serial data stream $326_2$ to the node interface $304b_2$ at the destination computing node 322b that corresponds to the second network switch $302_2$. The second serial data stream $326_2$ can then be provided to one or more data sinks 330.

SerDes is not performed in connection with the transmission of the serial data streams $326_1, 326_2$ from the source computing node 322a to the destination computing node 322b. However, SerDes can be performed in connection with the transmission of the set of parallel data streams 334 from the source computing node 322a to the destination computing node 322b.

A serializer 332 at the source computing node 322a can receive the set of j parallel data streams 334. FIG. 3 shows the serializer 332 receiving the first data stream $334_1$ in the set and the j data stream $334_j$ in the set. The serializer 332 can convert these parallel data streams 334 into an $n^{th}$ serial data stream $326_n$. An $n^{th}$ node interface $304a_n$ at the source computing node 322a can send the $n^{th}$ serial data stream $326_n$ to the destination computing node 322b via an $n^{th}$ network switch $302_n$. More specifically, the $n^{th}$ node interface $304a_n$ at the source computing node 322a can send the $n^{th}$ serial data stream $326_n$ to the switch interface $306a_n$ in the $n^{th}$ network switch $302_n$ that corresponds to the source computing node 322a. The $n^{th}$ network switch $302_n$ can then forward the $n^{th}$ serial data stream $326_n$ to the switch interface $306b_n$ that corresponds to the destination computing node 322b. This switch interface $306b_n$ can then forward the $n^{th}$ serial data stream $326_n$ to the node interface $304b_n$ at the destination computing node 322b that corresponds to the $n^{th}$ network switch $302_n$. A deserializer 336 at the destination computing node 322b can convert the $n^{th}$ serial data stream $326_n$ back into the set of parallel data streams 334, which can be provided to one or more data sinks 330.

Figure 4:
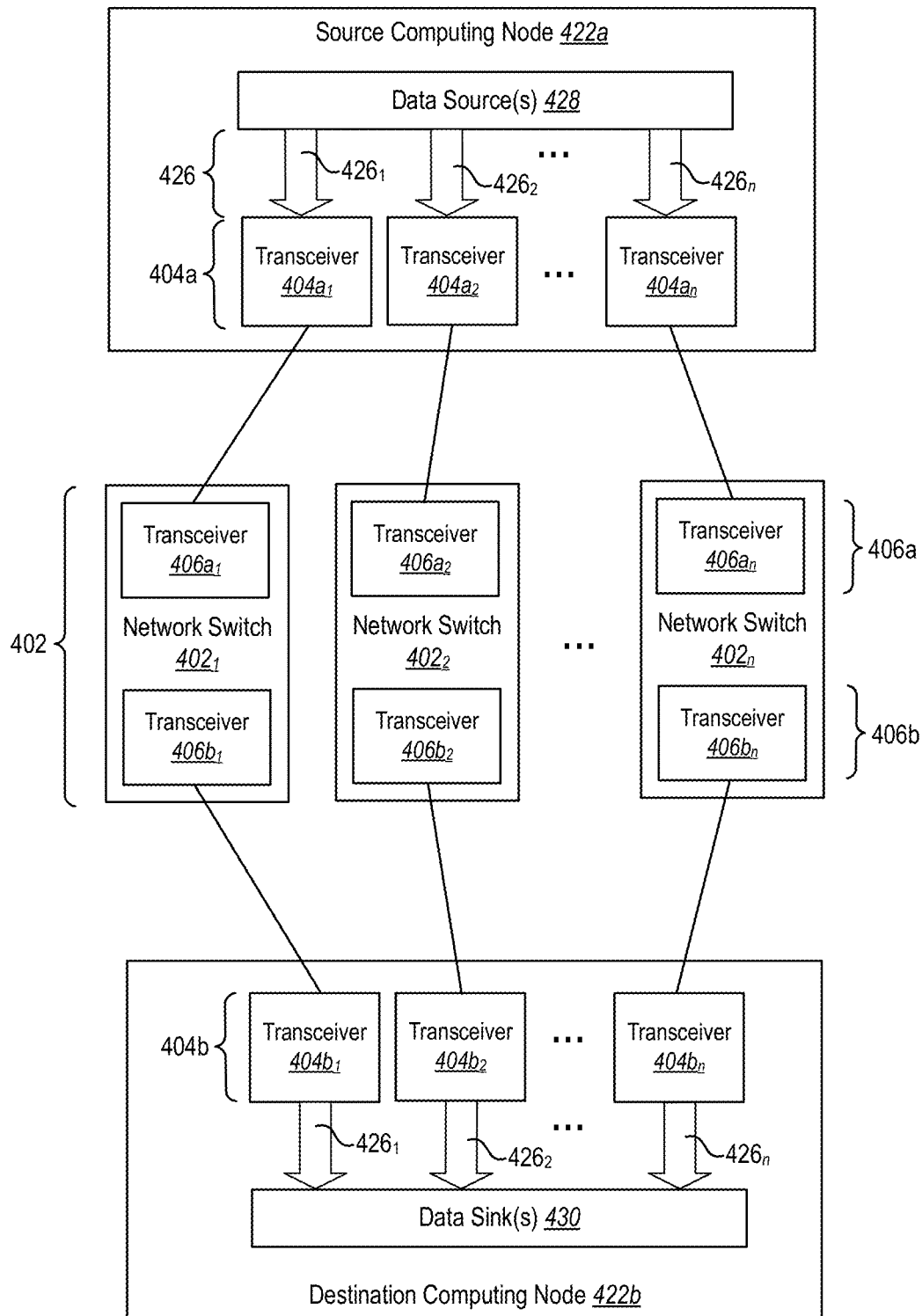
FIG. 4 illustrates an example of a network in which computing nodes can be optically coupled to network switches and that is configured to utilize the techniques disclosed herein.

As discussed above, in some embodiments, computing nodes can be optically coupled to network switches. FIG. 4 illustrates an example of a network 400 that is configured this way. In particular, FIG. 4 illustrates an example of a network 400 in which communication between computing nodes in the network 400 and network switches 402 can occur via optical communications.

The network 400 shown in FIG. 4 is similar in several respects to the network 200 that was previously discussed in connection with FIG. 2. For example, the network 400 includes a plurality of interconnected computing nodes including a source computing node 422a and a destination computing node 422b. The source computing node 422a has a plurality of data streams 426, originating from one or more data sources 428, to send to the destination computing node 422b. The plurality of data streams 426 include a first data stream 4261, a second data stream 4262, and an $n^{th}$ data stream $426_n$. To enable the parallel transmission of the plurality of data streams 426, the network 400 includes a plurality of network switches 402 that interconnect the plurality of computing nodes in the network 400, including the source computing node 422a and the destination computing node 422b. The network switches 402 are connected in parallel between the source computing node 422a and the destination computing node 422b (as well as at least some of the other computing nodes in the network 400). There are n network switches 402 in the depicted network 400. FIG. 2 shows a first network switch $402_1$, a second network switch $402_2$, and an $n^{th}$ network switch $402_n$.

In the network 400 shown in FIG. 4, the source computing node 422a and the destination computing node 422b are optically coupled to the network switches 402. The source computing node 422a, the destination computing node 422b, and the network switches 402 can all include a plurality of optical transceivers. To distinguish these optical transceivers from one another, the optical transceivers at the source computing node 422a and the destination computing node 422b may be referred to herein as node transceivers 404a, 404b. The optical transceivers at the network switches 402 may be referred to herein as switch transceivers 406a, 406b.

The computing nodes in the network 400, including the source computing node 422a and the destination computing node 422b, can include at least one node transceiver for each of the n network switches 402. In FIG. 4, the source computing node 422a is shown with a first node transceiver $404a_1$ corresponding to the first network switch $402_1$, a second node transceiver $404a_2$ corresponding to the second network switch $402_2$, and an $n^{th}$ node transceiver $404a_n$ corresponding to the $n^{th}$ network switch $402_n$. Similarly, the destination computing node 422b is shown with a first node transceiver $404b_1$ corresponding to the first network switch $402_1$, a second node transceiver $404b_2$ corresponding to the second network switch $402_2$, and an $n^{th}$ node transceiver $404b_n$ corresponding to the $n^{th}$ network switch $402_n$.

The network switches 402 can each include at least one switch transceiver for each computing node in the network 400, including the source computing node 422a and the destination computing node 422b. In FIG. 4, the first network switch $402_1$ is shown with a switch transceiver $406a_1$ corresponding to the source computing node 422a and a switch transceiver $406b_1$ corresponding to the destination computing node 422b. The second network switch $402_2$ is shown with a switch transceiver $406a_2$ corresponding to the source computing node 422a and a switch transceiver $406b_2$ corresponding to the destination computing node 422b. The $n^{th}$ network switch $402_n$ is shown with a switch transceiver $406a_n$ corresponding to the source computing node 422a and a switch transceiver $406b_n$ corresponding to the destination computing node 422b.

The node transceivers 404a, 404b are each optically coupled to a network switch 402. In particular, the first node transceiver $404a_1$ in the source computing node 422a is optically coupled to the switch transceiver $406a_1$ in the first network switch $402_1$. The second node transceiver $404a_2$ in the source computing node 422a is optically coupled to the switch transceiver $406a_2$ in the second network switch $402_2$. The $n^{th}$ node transceiver $404a_n$ in the source computing node 422a is optically coupled to the switch transceiver $406a_n$ in the $n^{th}$ network switch $402_n$. The first node transceiver $404b_1$ in the destination computing node 422b is optically coupled to the switch transceiver $406b_1$ in the first network switch $402_1$. The second node transceiver $404b_2$ in the destination computing node 422b is optically coupled to the switch transceiver $406b_2$ in the second network switch $402_2$. The $n^{th}$ node transceiver $404b_n$ in the destination computing node 422b is optically coupled to the switch transceiver $406b_n$ in the $n^{th}$ network switch $402_n$.

The plurality of data streams 426 can be sent from the source computing node 422a to the destination computing node 422b. This can occur similarly to the way that the plurality of data streams 226 shown in FIG. 2 can be sent from the source computing node 422a to the destination computing node 422b, which was discussed above. However, in the network 400 shown in FIG. 4, communication between the source computing node 422a and the network switches 402 and between the network switches 402 and the destination computing node 422b can occur via optical communications. Once the data streams 426 have been received at the destination computing node 422b, they can be provided to one or more data sinks 430.

In some embodiments, communication between the node transceivers 404a, 404b and the network switches 402 can occur via free-space optical communications. Alternatively, in other embodiments, communication between the node transceivers 404a, 404b and the network switches 402 can occur via optical cables such as fiber-optic cables.

Figure 5:
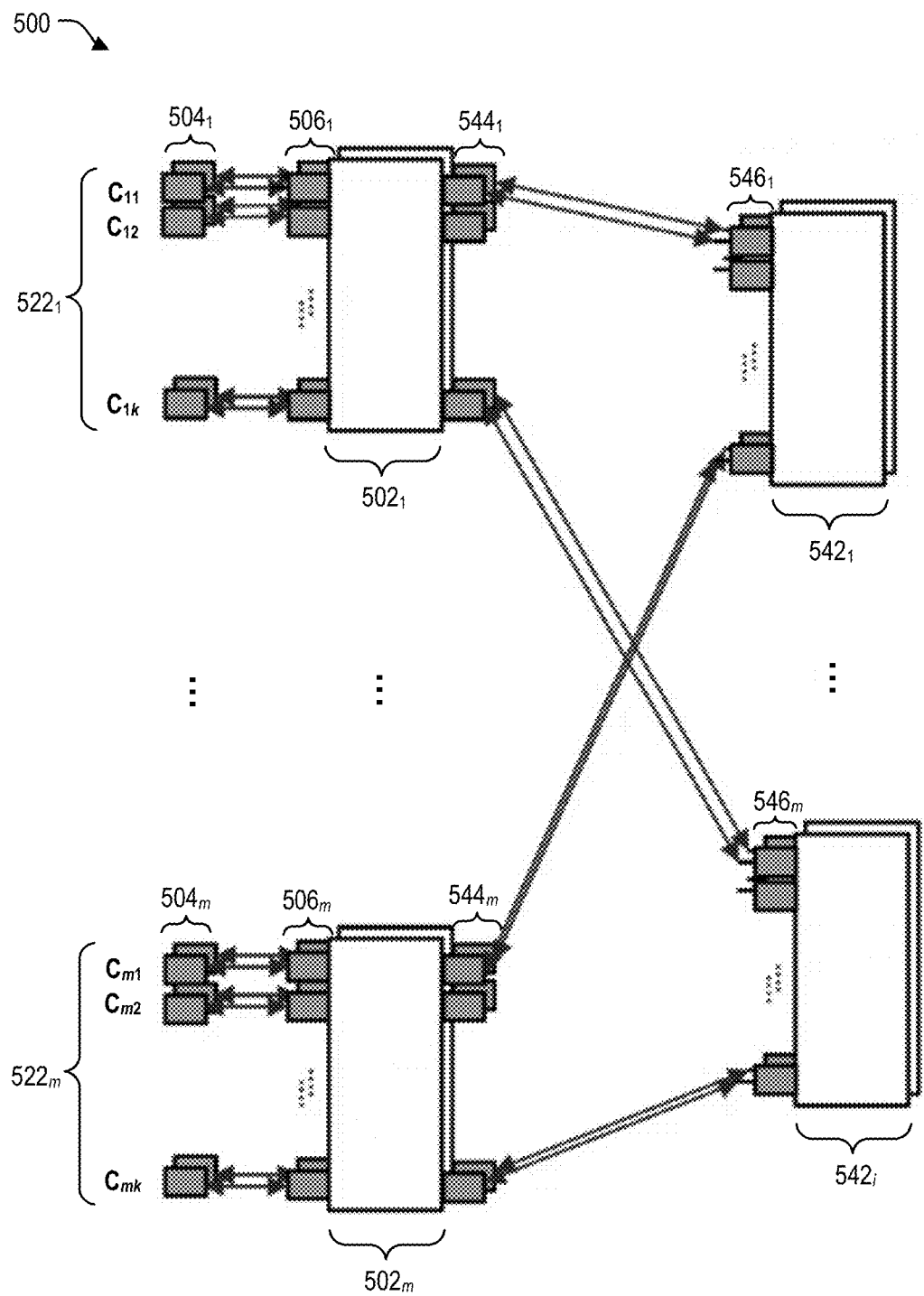
FIG. 5 illustrates an example of a network that is configured to utilize the techniques disclosed herein and that includes a plurality of sets of parallel switches that interconnect a plurality of sets of computing nodes.

In the examples discussed to this point, the networks have only included a single set of parallel switches that interconnects a single set of computing nodes. For example, the network 100 shown in FIGS. 1A-1D includes a single set of parallel network switches 102 that interconnects a single set of computing nodes $C_1, C_2, \ldots C_k$. However, the scope of the present disclosure should not be limited in this regard. A network that is configured in accordance with the present disclosure can include a plurality of sets of parallel switches that interconnect a plurality of sets of computing nodes. FIG. 5 illustrates an example of a network 500 that is configured in this way.

The network 500 shown in FIG. 5 includes m sets of computing nodes, where the value of m can be any integer that is greater than or equal to two. FIG. 5 shows a first set of computing nodes $522_1$ and an $m^{th}$ set of computing nodes $522_m$. For each set of computing nodes, there is a set of network switches that interconnects the set of computing nodes. FIG. 5 shows a first set of network switches $502_1$ that interconnects the first set of computing nodes $522_1$ and an $m^{th}$ set of network switches $502_m$ that interconnects the $m^{th}$ set of computing nodes $522_m$.

In the depicted network 500, a particular set of network switches can interconnect a particular set of computing nodes in a manner that is similar to any of the previously described examples. For example, n network switches can be used to interconnect a set of k computing nodes. Each computing node can include at least n node interfaces (at least one node interface for each network switch). In addition, each network switch can include at least k switch interfaces (at least one switch interface for each computing node).

FIG. 5 shows switch interfaces $506_1$ associated with the first set of network switches $502_1$ and switch interfaces $506_m$ associated with the $m^{th}$ set of network switches $502_m$. FIG. 5 also shows node interfaces $504_1$ associated with the first set of computing nodes $522_1$ and node interfaces $504_m$ associated with the $m^{th}$ set of computing nodes $522_m$.

To enable the different sets of computing nodes $522_1$-$522_m$ to communicate with each other, the network 500 includes additional sets of network switches. In the depicted network 500, there are i additional sets of network switches, where the value of i can be any integer that is greater than or equal to two. FIG. 5 shows a first additional set of network switches $542_1$ and an $i^{th}$ additional set of network switches $542_i$.

The various sets of network switches $502_1$-$502_m$, $542_1$-$542_m$ shown in FIG. 5 can be coupled to each other to facilitate communication between the various sets of computing nodes $522_1$-$522_m$. The sets of network switches $502_1$-$502_m$ are shown with additional switch interfaces $544_1$-$544_m$ that facilitate communication with the sets of network switches $542_1$-$542_m$. The sets of network switches $542_1$-$542_m$ are shown with switch interfaces $546_1$-$546_m$ that facilitate communication with the sets of network switches $502_1$-$502_m$.

In some embodiments, two components are "coupled" if they are electrically coupled, optically coupled, or mechanically coupled.

In some embodiments, two components are "electrically coupled" if electrical current can flow from one component to another. In some embodiments, two electrically coupled components can be in direct contact with each other such that current flows from the one component directly to the other component. However, this is not required. In some embodiments, two electrically coupled components may not be in direct contact with each other. There may be any number of other conductive materials and components disposed electrically between two components that are electrically coupled so long as current can flow therebetween.

In some embodiments, two optical components are "optically coupled" if there is an optical path between the two optical components. Thus, in such embodiments, a first optical component can be considered to be optically coupled to a second optical component if an optical transmission sent by the first component is received by the second optical component.

In some embodiments, a "network fabric" refers to a computer network architecture in which a plurality of computing systems or computing nodes are interconnected. In some embodiments, the computing systems or computing nodes in a network fabric can be interconnected using routers, switches, and other kinds of network components. In some embodiments, the computing systems or computing nodes in a network fabric can be interconnected in a way that provides low latency and/or high bandwidth interconnections between the various computing systems or computing nodes. In some embodiments, the computing systems or computing nodes in a network fabric can be interconnected using relatively few layers (e.g., two or three layers). This essentially flattens the network architecture, thereby reducing the distance between endpoints.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The described embodiments are to be considered as illustrative and not restrictive, and the present disclosure may be embodied in other forms besides those specifically described herein. The scope of the disclosure is, therefore, indicated by the appended claims rather than by the foregoing description. Changes that come within the meaning and range of equivalency of the claims are to be embraced within their scope.

What is claimed is:

1. A system for efficiently interconnecting computing nodes in a datacenter, comprising:
    a plurality of computing nodes including a source node and a destination node;
    a plurality of network switches coupled in parallel to the plurality of computing nodes;
    a plurality of node interfaces for each computing node among the plurality of computing nodes, wherein the plurality of node interfaces send and receive data communications among the plurality of computing nodes in the datacenter via the plurality of network switches, wherein the plurality of node interfaces send and receive data communications without the source node performing serialization and without the destination node performing deserialization; and a plurality of switch interfaces, wherein each network switch among the plurality of network switches comprises a switch interface for each computing node among the plurality of computing nodes, and wherein the switch interface corresponding to a computing node is coupled to a node interface corresponding to the computing node.

2. The system of claim 1, wherein each of the plurality of node interfaces is configured to receive a serial data stream from a data source and send the serial data stream to another computing node via a network switch among the plurality of network switches.

3. The system of claim 1, wherein:
the plurality of network switches are optically coupled to the plurality of computing nodes;
the plurality of node interfaces comprise a plurality of node optical transceivers, each node interface among the plurality of node interfaces comprising at least one node optical transceiver; and
the plurality of switch interfaces comprise a plurality of switch optical transceivers, each switch interface among the plurality of switch interfaces comprising at least one switch optical transceiver.

4. The system of claim 3, wherein communications between the plurality of node optical transceivers and the plurality of switch optical transceivers occur via free-space optical communications.

5. The system of claim 3, further comprising a plurality of optical cables that optically couple the plurality of node optical transceivers and the plurality of switch optical transceivers.

6. The system of claim 1, wherein the plurality of network switches are electrically coupled to the plurality of computing nodes.

7. A system for efficiently interconnecting computing nodes in a datacenter, comprising:
a first plurality of network switches that interconnect a first plurality of computing nodes including a first computing node and a second computing node, the first plurality of network switches being coupled in parallel to the first plurality of computing nodes;
a first plurality of switch interfaces, each network switch among the first plurality of network switches comprising a switch interface for each computing node among the first plurality of computing nodes;
a first plurality of node interfaces corresponding to the first computing node, wherein the first plurality of node interfaces are configured to send a plurality of parallel data streams to the second computing node via the first plurality of network switches, and wherein the first plurality of node interfaces send the plurality of parallel data streams to the second computing node without performing serialization; and
a second plurality of node interfaces corresponding to the second computing node, wherein the first plurality of node interfaces and the second plurality of node interfaces both comprise a node interface for each network switch among the first plurality of network switches, wherein the second plurality of node interfaces are configured to receive the plurality of parallel data streams from the first computing node via the first plurality of network switches, and wherein the second plurality of node interfaces are configured to receive the plurality of parallel data streams from the first computing node without performing deserialization.

8. The system of claim 7, wherein each node interface among the first plurality of node interfaces is configured to receive a serial data stream from a data source and send the serial data stream to the second computing node via the first plurality of network switches.

9. The system of claim 7, wherein each node interface among the second plurality of node interfaces is configured to receive a serial data stream from a network switch and send the serial data stream to a data sink on the second computing node.

10. The system of claim 7, wherein:
the first plurality of network switches are optically coupled to the first plurality of computing nodes including the first computing node and the second computing node;
the first plurality of node interfaces comprise a first plurality of node optical transceivers;
the second plurality of node interfaces comprise a second plurality of node optical transceivers; and
the first plurality of switch interfaces comprise a first plurality of switch optical transceivers optically coupled to the first plurality of node optical transceivers and a second plurality of switch optical transceivers optically coupled to the second plurality of node optical transceivers.

11. The system of claim 10, wherein the first plurality of node optical transceivers are configured to communicate with the first plurality of switch optical transceivers and the second plurality of node optical transceivers are configured to communicate with the second plurality of switch optical transceivers via free-space optical communications.

12. The system of claim 10, further comprising:
a first plurality of optical cables that optically couple the first plurality of node optical transceivers and the first plurality of switch optical transceivers; and
a second plurality of optical cables that optically couple the second plurality of node optical transceivers and the second plurality of switch optical transceivers.

13. The system of claim 7, wherein:
the first plurality of node interfaces are electrically coupled to a first subset of the first plurality of switch interfaces; and
the second plurality of node interfaces are electrically coupled to a second subset of the first plurality of switch interfaces.

14. The system of claim 7, further comprising:
a second plurality of network switches coupled to a second plurality of computing nodes; and
additional network switches that enable the first plurality of computing nodes to communicate with the second plurality of computing nodes, the additional network switches being coupled to the first plurality of network switches and the second plurality of network switches.

15. A system for efficiently interconnecting computing nodes, comprising:
a first plurality of network switches that interconnect a first plurality of computing nodes including a first computing node and a second computing node, wherein the first plurality of network switches are optically coupled to the first plurality of computing nodes in a parallel configuration;
a plurality of switch optical transceivers, wherein each network switch among the first plurality of network switches comprises a switch optical transceiver for each computing node among the first plurality of computing nodes;
a first plurality of node optical transceivers corresponding to the first computing node, wherein the first plurality of node optical transceivers are configured to transmit a plurality of parallel data streams to the second computing node via the first plurality of network switches, and wherein the first plurality of node optical transceivers transmit the plurality of parallel data streams to the second computing node without performing serialization; and a second plurality of node optical transceivers corresponding to the second computing node, wherein the first plurality of node optical transceivers and the second plurality of node optical transceivers both comprise at least one node optical transceiver for each network switch among the first plurality of network switches, wherein the second plurality of node optical transceivers are configured to receive the plurality of parallel data streams from the first computing node via the first plurality of network switches, and wherein the second plurality of node optical transceivers are configured to receive the plurality of parallel data streams from the first computing node without performing deserialization.

16. The system of claim 15, wherein each node optical transceiver among the first plurality of node optical transceivers is configured to receive a serial data stream from a data source and transmit the serial data stream to one of the plurality of switch optical transceivers.

17. The system of claim 15, wherein each node optical transceiver among the second plurality of node optical transceivers is configured to receive a serial data stream from one of the plurality of switch optical transceivers and provide the serial data stream to a data sink on the second computing node.

18. The system of claim 15, wherein the first plurality of node optical transceivers are configured to communicate with a first subset of the plurality of switch optical transceivers and the second plurality of node optical transceivers are configured to communicate with a second subset of the plurality of switch optical transceivers via free-space optical communications.

19. The system of claim 15, further comprising:
a first plurality of optical cables that optically couple the first plurality of node optical transceivers and a first subset of the plurality of switch optical transceivers; and
a second plurality of optical cables that optically couple the second plurality of node optical transceivers and a second subset of the plurality of switch optical transceivers.

20. The system of claim 15, further comprising:
a second plurality of network switches coupled to a second plurality of computing nodes; and
additional network switches that enable the first plurality of computing nodes to communicate with the second plurality of computing nodes, the additional network switches being optically coupled to the first plurality of network switches and the second plurality of network switches.

* * * * *